United States Patent
Orr (10) Patent No.: US 9,246,827 B1
(45) Date of Patent: *Jan. 26, 2016

(54) METHOD AND APPARATUS FOR CONTROLLING THE FLOW OF PACKETS IN A DATA NETWORK

(71) Applicant: MARVELL INTERNATIONAL LTD., Hamilton (BM)

(72) Inventor: Michael Orr, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,055

(22) Filed: Oct. 27, 2014

Related U.S. Application Data (63) Continuation of application No. 13/488,537, filed on Jun. 5, 2012, now Pat. No. 8,873,392.

(60) Provisional application No. 61/494,972, filed on Jun. 9, 2011.

(51) Int. Cl.
  *G01R 31/08* (2006.01)
  *H04L 12/851* (2013.01)

(52) U.S. Cl.
  CPC .................................. *H04L 47/2483* (2013.01)

(58) Field of Classification Search
  CPC .............. H04L 47/263; H04L 47/2475; H04L 47/2458
  See application file for complete search history.

(56) References Cited

U.S. PATENT DOCUMENTS

| | | | |
|---|---|---|---|
| 5,781,532 A * | 7/1998 | Watt | H04L 12/2854 370/236 |
| 7,457,322 B1 | 11/2008 | Flood et al. | |
| 7,558,872 B1 * | 7/2009 | Senevirathne | H04L 47/10 370/231 |
| 7,990,857 B2 | 8/2011 | Jain et al. | |
| 8,238,337 B1 | 8/2012 | Orr et al. | |
| 8,259,722 B1 | 9/2012 | Kharitonov | |
| 2003/0123393 A1 | 7/2003 | Feuerstraeter et al. | |
| 2004/0085976 A1 * | 5/2004 | Dale | H04B 7/18582 370/411 |
| 2004/0136370 A1 | 7/2004 | Moore et al. | |
| 2007/0237177 A1 * | 10/2007 | Endo | H04L 47/115 370/468 |
| 2009/0180478 A1 | 7/2009 | Yu et al. | |
| 2009/0245246 A1 * | 10/2009 | Veeragandham | H04L 12/5693 370/389 |
| 2011/0205897 A1 | 8/2011 | Pritam | |
| 2012/0008497 A1 * | 1/2012 | Tang | H04L 12/437 370/234 |

* cited by examiner

OTHER PUBLICATIONS

Wikipedia, Ethernet Flow Control, printed off http://en.wikipedia.org on Apr. 2, 2011 (4 pgs).

*Primary Examiner* — Asad Nawaz
*Assistant Examiner* — Syed S Ali (57) ABSTRACT

Systems, methods, and other embodiments associated with controlling the flow of packets in a network are described. According to one embodiment, an apparatus includes a transceiver and a flow logic. The flow logic is configured to control the transceiver to transmit a frame to a downstream device by determining whether the frame matches a predetermined pattern. The predetermined pattern identifies a source of frames. The predetermined pattern specifies an action to perform for frames received from the source that are to be transmitted to the downstream device. The flow logic is also configured to control the transceiver to transmit a frame to a downstream device by, in response to determining that the frame matches the predetermined pattern, controlling transmission of the frame to the downstream device according to the action specified by the predetermined pattern.

17 Claims, 3 Drawing Sheets

METHOD AND APPARATUS FOR CONTROLLING THE FLOW OF PACKETS IN A DATA NETWORK

CROSS REFERENCE TO RELATED APPLICATIONS

This patent disclosure is a continuation of U.S. patent application Ser. No. 13/488,537 filed on Jun. 5, 2012, now U.S. Pat. No. 8,873,392; which claims the benefit of U.S. Provisional Application No. 61/494,972 filed on Jun. 9, 2011.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In data networks, a frame of data (referred to herein generally as a "frame" or a "packet") is often communicated between a sequence of devices (e.g., switches and routers) in order to reach a destination. Such a sequence of devices is commonly referred to as hops in a network path, in that frames are relayed through the network path one hop at a time. Inevitably, some of the devices may become busy due to the devices being located centrally within a data network (e.g., centralized hop points), while other devices, e.g., on peripheral arteries, may experience less traffic within a data network. Accordingly, managing the flow of frames between devices on a data network can be a complex task. For example, the flow of incoming frames to a device (e.g., centralized device) can exceed the device's ability to provide the frames downstream. To avoid having to drop the excess incoming frames, the device buffers the incoming frames in an internal memory and provides the buffered frames downstream as resources permit. However, if this condition persists for an extended period of time, the internal memory of the device can become full, thus causing frames to be dropped.

Accordingly, when the internal memory reaches a threshold level of fullness, the device can provide a message to an upstream device that halts all frames from the upstream device. The upstream device will then buffer the traffic, instead of sending the traffic, until the device can once again receive frames. While this approach provides a basic solution to minimize the dropping of frames during times of peak traffic, difficulties with, for example, frames that are time sensitive can arise due to increased wait times while the frames are buffered.

SUMMARY

In one embodiment an apparatus includes a transceiver and a flow logic. The flow logic is configured to control the transceiver to transmit a frame to a downstream device by determining whether the frame matches a predetermined pattern. The predetermined pattern identifies a source of frames. The predetermined pattern specifies an action to perform for frames received from the source that are to be transmitted to the downstream device. The flow logic is also configured to control the transceiver to transmit a frame to a downstream device by, in response to determining that the frame matches the predetermined pattern, controlling transmission of the frame to the downstream device according to the action specified by the predetermined pattern.

In another embodiment, a method includes determining, for a frame received by an upstream device that is to be transmitted to a downstream device, whether the frame matches a predetermined pattern. The predetermined pattern identifies a source of frames. The predetermined pattern specifies an action to perform for frames received from the source that are to be transmitted to the downstream device. The method includes, in response to determining that the frame matches the predetermined pattern, controlling transmission of the frame to the downstream device according to the action specified by the predetermined pattern.

In another embodiment, a non-transitory computer-readable medium storing computer executable instructions that when executed by a computer cause the computer to perform a method that includes determining whether a frame received by the computer matches a predetermined pattern. The predetermined pattern identifies a source of frames. The predetermined pattern specifies an action to perform for frames received from the source that are to be transmitted to the downstream device. The method also includes, in response to determining that the frame matches the predetermined pattern, controlling transmission of the frame to the downstream device according to the action specified by the predetermined pattern.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. Additionally, in some examples, an element shown as an internal component of another element may be implemented as an external component and vice versa. Furthermore, elements may not be drawn to scale.

DETAILED DESCRIPTION

Disclosed herein are examples of systems, methods, and other embodiments associated with controlling the flow of packets in a data network. In one embodiment, the flow of packets in a data network is controlled on a per application basis. Per application flow control provides fine grain control of network traffic (e.g., frames) through devices in a network. Frames communicated in a network using per application flow control experience reduced difficulties from latency and jitter, which may be found in systems that halt all network traffic without regard to time sensitive frames. In addition to controlling the flow of packets on a per application basis, the flow of packets can be controlled based on a destination, a source, a priority of the packets and so on.

Figure 1:
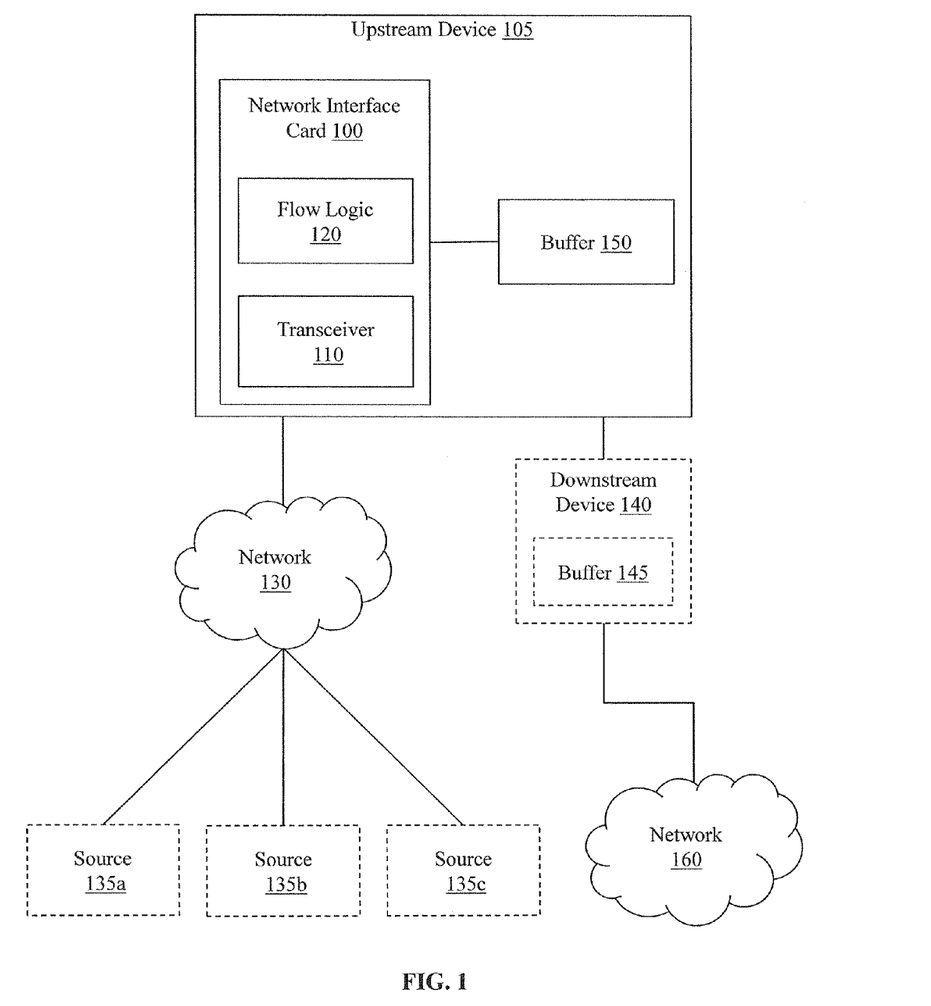
FIG. 1 illustrates one embodiment of a network interface card associated with controlling the flow of packets in a network.

With reference to FIG. 1, one embodiment of an apparatus e.g., a network interface card (NIC) 100, is shown that is associated with controlling the flow of packets in an upstream device 105. The NIC 100 includes a transceiver 110 and flow logic 120 that may control the flow of packets on a per-application basis. The transceiver 110 is configured to communicate via a wired and/or wireless connection over a network 130. A plurality of sources (e.g., sources 135a, 135b, and 135c) transmit communications on the network 130 to the NIC 100. The flow logic 120 is configured to control the transceiver 110 to transmit frames to a downstream device 140. The flow logic 120 controls the transceiver 110 according to one or more flow control rules. When the NIC 100 is sending and/or receiving frames, a buffer 150 temporarily stores frames that are, for example, paused according to a flow control rule.

In general, the downstream device 140 receives frames transmitted by the transceiver 110 from the upstream device 105. The downstream device 140 can also provide frames to the upstream device 105; however, for purposes of this discussion the primary flow of frames will be discussed as coming from the upstream device 105 to the downstream device 140. In one embodiment, the upstream device 105 is linked directly to the downstream device 140. That is, the upstream device 105 is connected directly to the downstream device 140 via a wired or wireless connection. The upstream device 105 and the downstream device 140 are, for example, neighboring switches that are part of the network 130. In other embodiments, the upstream device 105 and the downstream device 140 are neighboring devices that can be any combination of devices including routers, bridges, switches, gateways, hubs, and so on. Additionally, the downstream device 140 transmits received frames to a network 160 or, alternatively, to a final destination.

The upstream device 105 receives frames from the sources 135a, 135b, and 135c via the network 130. The sources 135a, 135b, and 135c are, for example, applications that generate frames. Multiple applications may be installed on a single remote device, or the sources 135a, 135b, and 135c may each be installed on different remote devices. Depending on a task being performed, an application (e.g., source 135a) may require a certain standard of service in order to operate without difficulties (e.g., without jitter). Accordingly, frames from each source can have an associated class of service (CoS) in order to ensure a predefined level of service from network devices.

Class of service refers to a priority given to frames when being communicated between network devices. Class of service is often used to provide different priority levels to frames from different applications depending on differing needs of the applications. Accordingly, frames from two applications with the same class of service are treated equally when the frames are transmitted through a network. That is, data frames from one application are not given preference over data frames from another application with the same CoS. However, frames from both applications are given preference over frames from applications classified at a lower CoS level. In a system that prioritizes frames using CoS levels, frames may be classified using multiple separate levels. For example, the IEEE 802.1p standard defines eight priority levels. In IEEE 802.1p, the lowest level (e.g., level zero) is used for background frames, and the highest level (e.g., level seven) is used for network control frames.

To illustrate one example of a network using per application flow control, consider the following comparison with a network that uses basic flow control. In this comparison, suppose two different applications (e.g., sources) have the same class of service (CoS). First, consider a network that can only provide basic flow control, as discussed above. In basic flow control, when the downstream device 140 becomes too busy, the downstream device 140 requests the upstream device 105 to pause all network traffic. The result of pausing all traffic is that frames are delayed. While a first application (e.g., source 135a) may experience no problems from the delay (because it is transmitting frames that are not time sensitive), a second application (e.g., source 135b) may experience difficulties from increased latency when the upstream device 105 pauses frames.

Now, consider a network that implements flow control using CoS levels. Instead of pausing all frames at the upstream device 105, subsets of frames are paused according to CoS levels. For example, frames with a CoS level lower than five (out of the eight classification levels, as discussed above) are paused for a period of time x. Furthermore, consider that frames for the first application and the second application are classified in level four. In this configuration, frames for both applications are still paused (e.g., buffered). Thus, the difficulties discussed above persist.

To continue with the comparison, consider a situation where the two applications both have CoS levels that are six. In this example, pausing frames below CoS level five results in frames from both applications continuing to be transmitted. Here, difficulties associated with the second application are now avoided because the frames are not delayed. However, frames from the first application also continue to be transmitted. Recall that frames from the first application are not time sensitive. Thus, pausing frames from the first application can occur without negatively impacting the first application's performance. But in this example, frames from the first application are still being transmitted resulting in inefficiencies from having extra traffic that could be paused in the network. Accordingly, performing flow control based on CoS levels may continue to result in difficulties with applications designated within the same CoS level.

Therefore, in one embodiment, flow control through a network device (e.g., the upstream device 105) is provided on a per application basis in order to refine network flow control. To continue with the above example of the first application and the second application, consider that the downstream device 140 wishes to reduce a rate of incoming traffic from the upstream device 105. Thus, the downstream device 140 sends a flow control rule to the upstream device 105.

Furthermore, consider that CoS levels for the first application and the second application are level four. Since the upstream device 105 is configured to support per application flow control, a flow control rule can specify which frames to transmit or pause on a per-application basis. For example, the flow control rule can specify to pause all frames with a CoS level that is less than five except for frames from the second application. Now, frames from the second application continue to be transmitted to the downstream device 140, while frames from the first application, which has the same CoS level, are paused (i.e., buffered). By controlling the flow of frames on a per application basis, difficulties with, for example, time sensitive frames are avoided. Thus, per application flow control permits the downstream device 140 to control transmission of frames by the upstream device 105 in a refined manner using flow control rules.

In another embodiment, flow control rules can be provided to the upstream device 105 from a network management routine that is located remotely (e.g., in a separate network, at a source 135a, and so on) from the upstream device 105 and the downstream device 140. Additionally, the network management routine or the downstream device 140 can provide flow control rules to devices that are further upstream from the upstream device 105 to control the flow of packets. In still other embodiments, the network management routine can monitor the downstream device 140 from a remote location and modify a flow of packets using a flow control sent from the remote location.

A variety of circumstances may arise that affect the transmission of frames through the downstream device 140. Thus, a flow control rule may be provided by the downstream device 140 to handle various conditions. The conditions may be, for example, when the buffer 145 in the downstream device 140 reaches a predefined level of fullness, when the downstream device 140 detects a security threat, when the downstream device 140 detects that a link to a destination has failed, and so on. Additionally, the flow control rule is transmitted by the downstream device 140 in a control frame that is, for example, a CISCO™ discovery protocol (CDP) frame, a link layer discovery protocol (LLDP) frame, or a control frame based on another implemented protocol (e.g., the OpenFlow standard, the OpenFlow Configuration Protocol, and so on). In further embodiments, the flow control rule is compatible with IEEE 802.3x, 802.1Qbb, and so on.

To account for the variety of circumstances that may affect the transmission of frames, the flow control rule(s) may specify many different actions. For example, the flow control rule(s) can instruct the upstream device 105 to promote frames from a source to a higher class of service (CoS) level, demote frames from a source to a lower CoS level, drop frames from a source, pause (e.g., halt/buffer) frames from a source, permit transmission of frames from a source regardless of a CoS level, log frames from a source, redirect frames from a source to a different destination, and so on.

While promoting, demoting, dropping, pausing, logging, redirecting, and permitting are discussed as possible actions for flow control rules, this list of actions is not intended as an exhaustive listing of possible actions, but is intended only as an example of actions that can be specified by the flow control rule.

Furthermore, actions specified in the flow control rule can be applied in a complex manner, such as, "permit frames from source A, while pausing frames with a CoS level that is less than five for X time period." The flow logic 120 is configured to identify and process flow control rules, and supports complex sets of actions and conditions for flow control rules. As shown in the previous example, actions can be specified for a single source or for multiple sources defined by a CoS level. While the example illustrates both a single source (i.e., source A) and a set of sources (i.e., CoS level <5), a flow control rule can specify a source as, for example, a set of devices with a particular application, a particular application type, devices in a specific geographic region, and so on.

To identify whether a frame is from a source specified by the flow control rule, the flow logic 120 is configured to use a key value from the flow control rule. The key value can include one or more parameters used by the flow logic 120 to, for example, scan header values of incoming frames to determine whether the incoming frames match a flow control rule. The key value can include a device identifier/address, an application identifier, an application type, a class of service, a combination of these identifiers, a predetermined pattern, and so on.

Additionally, a flow control rule can specify a time period during which the flow control rule is valid. When the flow control rule specifies a time period, the flow logic 120 enforces the flow control rule only during the time period specified. In this way, the flow control rule can be configured to operate for specific timeframes during a day (e.g., 12 pm to 1 pm) or to automatically expire after a specified time lapse (e.g., 10 seconds). Accordingly, the flow control rule can be generated to modify the flow of frames for a period of time sufficient to resolve temporary conditions (e.g., an event that lasts for only 20 μs or that occurs at the same time everyday).

Furthermore, the time period specified in the flow control rule may only be observed by the flow logic 120 as resources of the upstream device 105 permit. For example, if the flow control rule specifies that all frames are to be paused for 500 μs, but the buffer 150 of the upstream device 105 is full after only 200 μs, then the flow logic 120 can resume transmission of the frames before expiration of the time period. Resuming transmission of the frames may avoid dropping frames that cannot be stored in the buffer 150. Alternatively, the upstream device 105 can provide a flow control rule to a third device from which the frames are being received. In this case, the third device may be controlled to pause frames from the source for 300 μs. By extrapolating the flow control rule upstream to the third device, the burden of buffering frames can be spread to additional devices. In this way, the flow control rule can prevent dropping frames for the remainder of the effective time for the original flow control rule.

While a flow control rule can specify a time period during which the rule is active, the time period is not required for implementing a flow control rule by the flow logic 120. In another embodiment, a flow control rule may be set with no expiration and terminates upon a trigger event. For example, the downstream device 140 can provide a message to terminate the flow control rule, or the flow control rule terminates when it is modified by another flow control rule. In either case, the flow logic 120 controls transmission of frames by the transceiver 110 according to flow control rules from the downstream device 140.

In another embodiment, flow control rules received from the downstream device 140 are added to an access control list (ACL) or a policy control list (PCL) as they are received. The ACL identifies, for example, a list of permissions that include the flow control rules. The ACL can identify permissions and access rights for different users and applications in a network that are enforced by the upstream device 105. The PCL is a more generalized control list than the ACL. For example, while the ACL includes a permissions list, the PCL includes a more generalized list that can identify, for example, a priority listing for different sources. In general, the PCL implements a richer set of actions than the ACL. Accordingly, the downstream device 140 can improve the flow of frames by adding flow control rules to the ACL or the PCL of the upstream device 105.

Figure 2:
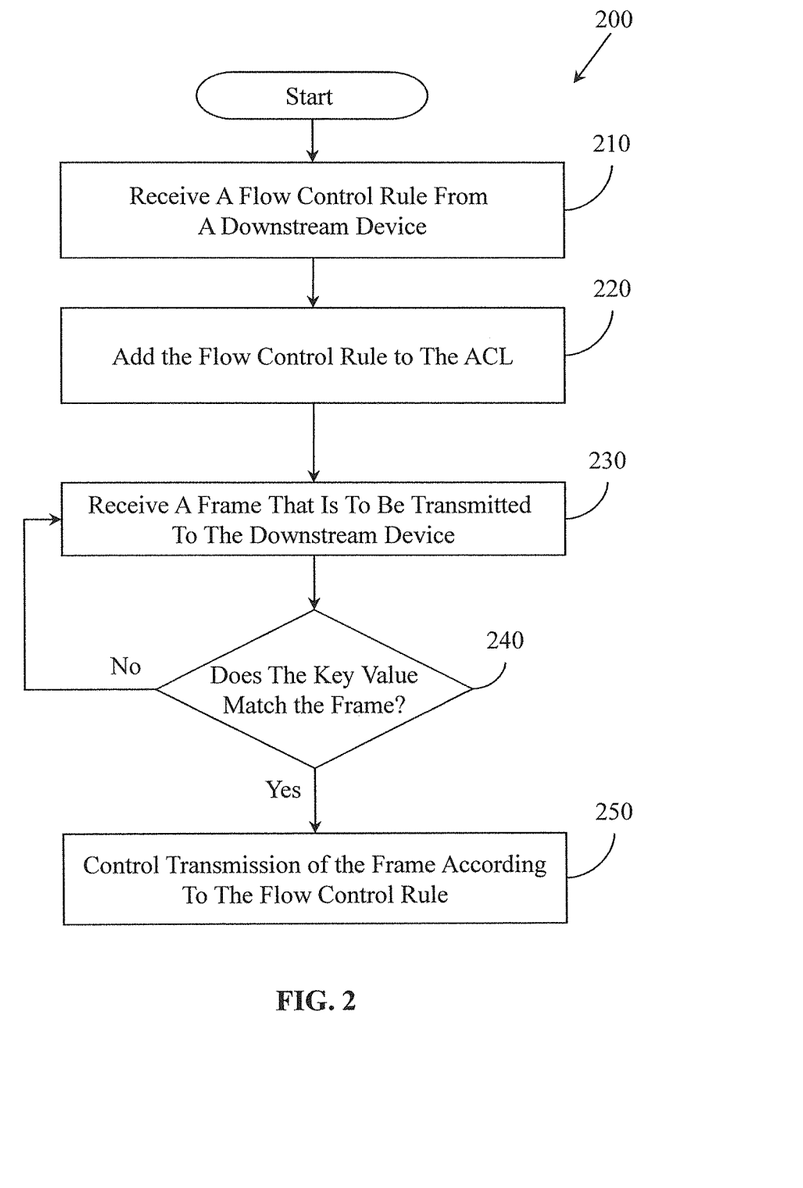
FIG. 2 illustrates one embodiment of a method associated with controlling the flow of packets in a network.

Further details of per application flow control are discussed with reference to FIG. 2. FIG. 2 illustrates one embodiment of a method 200 associated with per application flow control in a network. FIG. 2 is discussed from the perspective that the method 200 is implemented and performed by, for example, the upstream device 105 of FIG. 1.

At 210 of the method 200, a flow control rule is received from a downstream device. In one embodiment, the flow control rule is included in a control frame from the downstream device. The control frame is, for example, a data link layer discovery frame (e.g., a layer 2 frame of the 7 layer open systems interconnect (OSI) model) that specifies the flow control rule. In another embodiment, the flow control rule is provided in a per priority flow control message with an extension that specifies the flow control rule. As discussed above, the flow control rule specifies one or more actions to be performed for frames that originate from one or more identified sources.

At 220, the flow control rule is added to, for example, an access control list (ACL) in response to being received. The flow control rule may take the form of, for example, a command line interface (CLI) command. Alternatively, the flow control rule is encoded as a part of a control frame received from the downstream device. In either case, the flow control rule causes the upstream device to add an entry to the ACL.

The ACL includes a list of permissions for users, applications, and devices in a network that are enforced by the device on which the ACL resides (e.g., the upstream device). Accordingly, by adding the flow control rule to the ACL, the upstream device automatically enforces the flow control rule while enforcing other permissions/restrictions represented by the ACL. In another embodiment, the flow control rule is added to a PCL. The PCL is implemented in a similar manner to the ACL, but can include, for example, broader categories of actions to perform, such as, redirecting, logging, and so on.

The downstream device provides the flow control rule in order to control frames that are processed by and sent from the upstream device. For example, the downstream device may need to reduce the rate of incoming frames due to an overflow condition. The overflow condition occurs when the rate of incoming frames exceeds the rate of outgoing frames and the buffers within the downstream device cannot store all of the excess frames. If the downstream device does not take actions to reduce the rate of incoming frames, then frames will be dropped from an overflow of internal buffers. Dropping frames can negatively impact sources of frames that, for example, require lossless communications.

While the overflow condition is one example of a scenario when the downstream device controls the flow of frames through the upstream device, many other scenarios are possible. Further examples of events when the downstream device generates a flow control rule can include, when the downstream device detects a link failure, when the downstream device encounters an internal processing error, when the downstream device detects a security threat, and so on. Once the ACL/PCL includes at least one flow control rule, the method 200 proceeds to 230, where the flow control rule is enforced against incoming frames.

At 230, a frame is received. If the upstream device 105 is, for example, a device with a single downstream link (e.g., a network bridge), then the method 200 proceeds to 240. However, if the upstream device 105 is, for example, a router that provides frames to multiple destinations, then a destination of the frame needs to be determined before the method 200 can proceed to 240. The NIC 100 (shown in FIG. 1) may determine a destination for the frame from a routing table, a local domain name service, a header of the frame, and so on. If, at 230, a determination is made that the frame is to be transmitted to the downstream device, then the method proceeds to 240. If the frame is not to be transmitted to the downstream device, then processing and transmission of the frame occurs normally without regard to the flow control rule. In this way, the method 200 applies the flow control rule to only frames destined for the downstream device that originally generated the flow control rule.

At 240, the method 200 determines whether a key value from the flow control rule matches the frame. In one embodiment, the key value is compared against values from a header of the frame to identify whether the frame matches the flow control rule. For example, the key value can include several parameters that are used to identify whether the frame is from a correct source. Thus, the header of the frame is scanned for the parameters of the key value to determine whether the frame is a match.

As an example, consider that the key value can identify a source using 1) an application type, and 2) an address of a remote device. In this way, the key value can be used to specify that the flow control rule is to be applied to frames from a particular application on a specific device. In other embodiments, the key value identifies only an application type and not a particular remote device. In this way, the key value can specify a source as a broader category that includes frames from an application that may be installed on many different remote devices. Thus, the key value is capable of identifying a specific source (e.g., one application on a single device) or a category of sources that is not a deterministic set of devices, but a category of sources (e.g., all voice over internet protocol applications). Additionally, the key value can identify subsets of sources according to geographic location, class of service, and more generally by any metrics available from header values for a frame.

At 240, if the frame does not match the key value, then the method 200 proceeds back to 230, where the process of matching begins again with another frame. However, if the frame matches the key value, then the method 200 proceeds to 250. To match the key value a source does not necessarily need to be explicitly identified by the key value. For example, consider a flow control rule that specifies to "pause all frames, except frames from source A." In this example, any frame that is to be transmitted to the downstream device matches the key value, because the flow control rule broadly specifies all frames. Here, the difference is that different actions are performed on the frames, at 250, depending on an identity of a source of the frame (e.g., source A vs. all other sources).

At 250, the action(s) specified in the flow control rule are applied to the frame. In this way, transmission of the frame is controlled according to the flow control rule. In one embodiment, an action specified by the flow control rule is applied to the frame while the frame is in a buffer awaiting transmission. Consider an example where the flow control rule specifies that the frame is to be promoted to a higher class of service (CoS) level. While the frame is awaiting transmission in the buffer (e.g., buffer 150 in FIG. 1), a parameter associated with the CoS level is modified in the header of the frame. Once the frame is modified, in this case, it is then transmitted because it now has a sufficient class of service to garner immediate transmission. In other embodiments, applying an action from the flow control rule includes moving the frame to a buffer, changing a destination address in a header of the frame, marking the frame to be immediately transmitted, and so on.

Additionally, many different actions and combinations of actions can be applied to frames. For example, the actions specified by the flow control rule can include changing a class of service for the frame, permitting transmission of the frame, pausing transmission of the frame, logging information about the frame, copying the frame, redirecting the frame to a different destination, dropping the frame, and so on. As another example, consider a flow control rule that specifies a simple action, such as, "pause frames from source A." In this example, frames from source A are paused/buffered while all other frames continue to be transmitted to the downstream device. In this flow control rule, the frames are being paused in order to, for example, ensure that no frames are dropped by the downstream device for source A or because source A is sending an excessive number of frames.

Furthermore, the actions can be used in combination, with logical operators, and with specific time periods for implementing the flow control rule. The following flow control rules are provided as examples of different complex combinations of actions, operators, and time periods.

EXAMPLES

1) Permit frames from source A for X seconds. This flow control rule explicitly allows frames from source A to be transmitted for the specified time frame regardless of any other flow control rule that may pause or drop the frames from source A.

2) Pause frames with a CoS< five while Permitting frames from Source A. This flow control rule pauses a frame if the CoS level is less than five, but allows frames from source A regardless of a CoS level.

3) Redirect frames from source A to destination Y for the next X seconds. This flow control rule redirects frames from source A to a destination Y for a time period defined by X. This example illustrates how the flow control rule can redirect packets around the downstream device while, for example, the downstream device is busy. While the new destination Y may not be a shortest route to a final destination, it still permits the frame to be communicated instead of being paused at the upstream device.

4) Pause frames from source A for the next X seconds. This flow control rule pauses frames only from source A for a time period defined by X.

5) Log Frames with destination Y. This flow control rule logs information about frames with destination Y as a header value. Logging information about frames can be useful to, for example, troubleshoot network problems or monitor for network security.

6) Drop frames from sources A, B, C and frames with a CoS <3. This flow control rule drops frames from sources A, B, and C as well as frames with a CoS less than 3.

7) Permit frames with a CoS equal to 5, while pausing frames with a CoS of >5, and dropping frames with a CoS <5. This flow control rule carves out CoS level 5 as the only frames that will continue to be transmitted. Frames with a CoS level less than 5 are dropped and frames with a CoS greater than 5 are paused.

8) Change frames from source A to CoS 7 while pausing frames with a CoS <7 for the next X seconds. This flow control rule modifies the CoS level for frames from source A to CoS level 7, while pausing frames with a CoS of less than 7 for the time period defined by X. In this example, the source A is promoted in order to ensure continued transmission of frames while limiting other traffic for the specified time period X.

9) Pause all frames for the next X seconds. This flow control rule pauses all frames that are to be transmitted to the downstream device for a time period X seconds.

10) Pause frames with a CoS equal to 6. This flow control rule pauses only frames with a CoS of 6. If, for example, a spike in traffic from a particular CoS level is experienced then that particular CoS can be paused.

The above 10 flow control rules are provided as examples and are not intended as an exhaustive list of flow control rules. Additionally, the above examples are provided as functional examples, and are not intended as explicit examples of syntax for a flow control rule.

Figure 3:
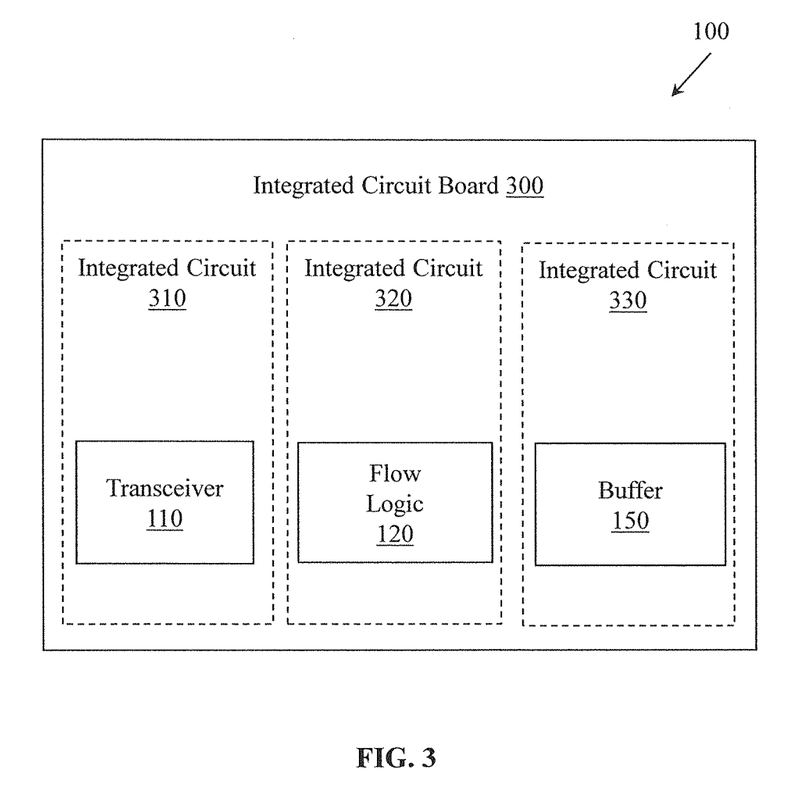
FIG. 3 illustrates one embodiment of an integrated circuit associated with controlling the flow of packets in a network.

FIG. 3 illustrates another embodiment of the NIC 100 from FIG. 1 that is configured with separate integrated circuits and/or chips. In this embodiment, the transceiver 110 from FIG. 1 is embodied as a separate integrated circuit 310. Additionally, the flow logic 120 is embodied on an individual integrated circuit 320. The buffer 150 is embodied on an individual integrated circuit 330. The buffer 150 is, for example, a tertiary content addressable memory (TCAM), a flash memory, a cache, and so on. The circuits are connected via connection paths to communicate signals. While integrated circuits 310, 320, and 330 are illustrated as separate integrated circuits, they may be integrated into a common integrated circuit board 300. Additionally, integrated circuits 310, 320, and 330 may be combined into fewer integrated circuits or divided into more integrated circuits than illustrated.

In another embodiment, the transceiver 110 and the flow logic 120 illustrated in integrated circuits 310 and 320 may be combined into a separate application specific integrated circuit. In other embodiments, the functionality associated with the transceiver 110 and the flow logic 120 may be embodied as firmware executable by a processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, fewer than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a transceiver; and
   a flow logic configured to control the transceiver to transmit a frame to a downstream device by
   determining whether the frame matches a predetermined pattern, wherein the predetermined pattern identifies a source of frames, and wherein the predetermined pattern specifies an action to perform for frames received from the source that are to be transmitted to the downstream device, and
   in response to determining that the frame matches the predetermined pattern, controlling transmission of the frame to the downstream device according to the action specified by the predetermined pattern,
   wherein the predetermined pattern is received from the downstream device, and wherein the flow logic is configured to control transmission of the frame by selecting an action according to the predetermined pattern, wherein the action includes changing a class of service for the frame by modifying the class of service in a header of the frame, pausing transmission of the frame, logging information about the frame, redirecting the frame to a different destination, permitting transmission of the frame, and dropping the frame,
   wherein changing the class of service includes promoting the frame to a higher class of service and demoting the frame to a lower class of service, wherein controlling transmission of the frame according to the action manages the flow of the frame through the network, wherein the class of service defines a priority level associated transmitting the frame, and wherein the priority level is selected from a range of priority levels that include at least eight different priority levels.

2. The apparatus of claim 1, wherein the source is a member of a class of service of a plurality of classes of service, and wherein the predetermined pattern permits frames from the source to be transmitted to the downstream device while pausing frames from other sources in the class of service.

3. The apparatus of claim 1, wherein the source is an application on a remote device connected to a network, wherein the apparatus is not the originating source of the frame, wherein the predetermined pattern permits the downstream device to selectively control which frames the apparatus transmits to the downstream device, wherein the apparatus is one hop from the downstream device, and wherein the predetermined pattern is a metric value from a header of the frame that identifies the source.

4. The apparatus of claim 1, wherein the apparatus is a network interface card or an integrated circuit.

5. The apparatus of claim 1, wherein the flow logic is configured to control the transceiver by:
   adding the predetermined pattern to an access control list (ACL) in response to receiving the predetermined pattern from the downstream device, wherein the predetermined pattern is received from the downstream device in a control frame that is a data link layer discovery frame or a per priority flow control message with an extension that specifies the predetermined pattern.

6. The apparatus of claim 1, wherein the flow logic is configured to determine whether the frame matches the predetermined pattern by:
   scanning a plurality of frames received by the transceiver that are to be transmitted to the downstream device by using the predetermined pattern, wherein scanning includes scanning values in a header of each frame of the plurality frames while the frames are in a buffer associated with the transceiver.

7. A method, comprising:
   determining, for a frame received by an upstream device that is to be transmitted to a downstream device, whether the frame matches a predetermined pattern, wherein the predetermined pattern identifies a source of frames, and wherein the predetermined pattern specifies an action to perform for frames received from the source that are to be transmitted to the downstream device; and
   in response to determining that the frame matches the predetermined pattern, controlling transmission of the frame to the downstream device according to the action specified by the predetermined pattern,
   wherein the predetermined pattern is received from the downstream device, and wherein controlling transmission of the frame by selecting an action according to the predetermined pattern, wherein the action includes changing a class of service for the frame by modifying the class of service in a header of the frame, pausing transmission of the frame, logging information about the frame, redirecting the frame to a different destination, permitting transmission of the frame, and dropping the frame,
   wherein changing the class of service includes promoting the frame to a higher class of service and demoting the frame to a lower class of service, wherein controlling transmission of the frame according to the action manages the flow of the frame through the network, wherein the class of service defines a priority level associated transmitting the frame, and wherein the priority level is selected from a range of priority levels that include at least eight different priority levels.

8. The method of claim 7, wherein the source is a member of a class of service of a plurality of classes of service, and wherein the predetermined pattern permits frames from the source to be transmitted to the downstream device while pausing frames from other sources in the class of service.

9. The method of claim 7, wherein the source is an application on a remote device connected to a network, wherein the upstream device is not the originating source of the frame, wherein determining whether the frame matches the predetermined pattern permits the downstream device to selectively control which frames the upstream device transmits to the downstream device, wherein the upstream device is one hop from the downstream device and wherein the predetermined pattern is a metric value from a header of the frame that identifies the source.

10. The method of claim 7, wherein the predetermined pattern specifies a period of time for implementing the predetermined pattern.

11. The method of claim 7, further comprising:
    adding the predetermined pattern to an access control list (ACL) in response to receiving the predetermined pattern from the downstream device, wherein the predetermined pattern is received from the downstream device in a control frame that is a data link layer discovery frame or a per priority flow control message with an extension that specifies the predetermined pattern.

12. The method of claim 7, wherein determining whether the frame matches the predetermined pattern further comprises:
    scanning a plurality of frames received by the upstream device that are to be transmitted to the downstream device by using the predetermined pattern, wherein scanning includes scanning values in a header of each frame of the plurality frames while the frames are in a buffer associated with the upstream device.

13. A non-transitory computer-readable medium storing computer executable instructions that when executed by a computer cause the computer to perform a method, the method comprising:
- determining whether a frame received by the computer matches a predetermined pattern, wherein the predetermined pattern identifies a source of frames, and wherein the predetermined pattern specifies an action to perform for frames received from the source that are to be transmitted to the downstream device; and
- in response to determining that the frame matches the predetermined pattern, controlling transmission of the frame to the downstream device according to the action specified by the predetermined pattern, wherein controlling transmission of the frame includes modifying transmission of the frame from an original transmission,
- wherein the predetermined pattern is received from the downstream device, and wherein controlling transmission of the frame by selecting an action according to the predetermined pattern, wherein the action includes changing a class of service for the frame by modifying the class of service in a header of the frame, pausing transmission of the frame, logging information about the frame, redirecting the frame to a different destination, permitting transmission of the frame, and dropping the frame,
- wherein changing the class of service includes promoting the frame to a higher class of service and demoting the frame to a lower class of service, wherein controlling transmission of the frame according to the action manages the flow of the frame through the network, wherein the class of service defines a priority level associated transmitting the frame, and wherein the priority level is selected from a range of priority levels that include at least eight different priority levels.

14. The non-transitory computer-readable medium of claim 13, wherein the source is a member of a class of service of a plurality of classes of service, and wherein the predetermined pattern permits frames from the source to be transmitted to the downstream device while pausing frames from other sources in the class of service.

15. The non-transitory computer-readable medium of claim 13, wherein the source is an application on a remote device connected to a network, wherein the computer is not the originating source of the frame, wherein determining whether the frame matches the predetermined pattern permits the downstream device to selectively control which frames the computer transmits to the downstream device, wherein the computer is one hop upstream from the downstream device and wherein the predetermined pattern is a metric value from a header of the frame that identifies the source.

16. The non-transitory computer-readable medium of claim 13, the predetermined pattern specifies a period of time for implementing the predetermined pattern.

17. The non-transitory computer-readable medium of claim 13, further comprising:
- adding the predetermined pattern to an access control list (ACL) in response to receiving the predetermined pattern from the downstream device, wherein the predetermined pattern is received from the downstream device in a control frame that is a data link layer discovery frame or a per priority flow control message with an extension that specifies the predetermined pattern; and wherein determining whether the frame matches the predetermined pattern further comprises: scanning a plurality of frames received by the transceiver that are to be transmitted to the downstream device by using the predetermined pattern, wherein scanning includes scanning values in a header of each frame of the plurality frames while the frames are in a buffer associated with the transceiver.

* * * * *